Patented Feb. 11, 1941

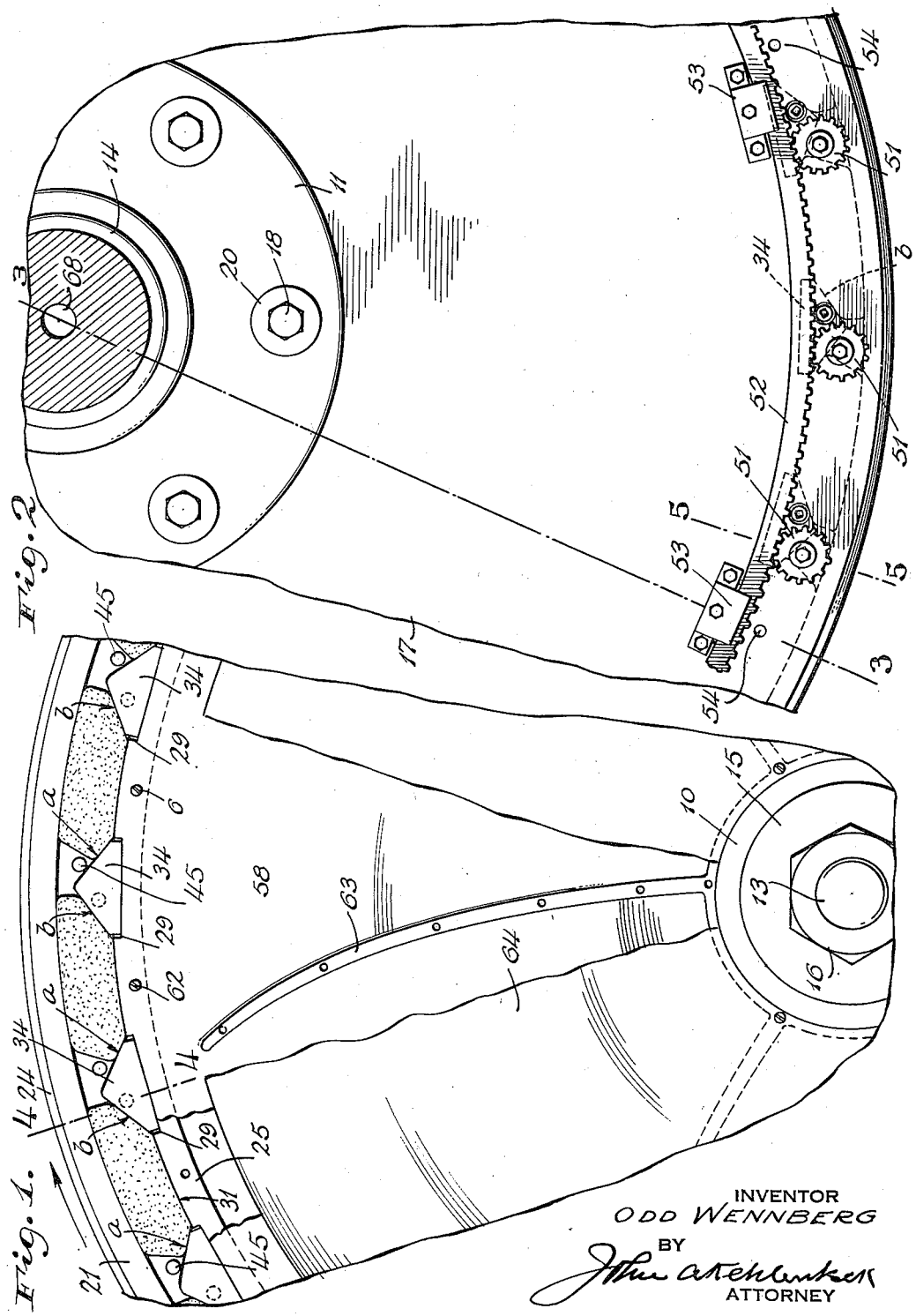

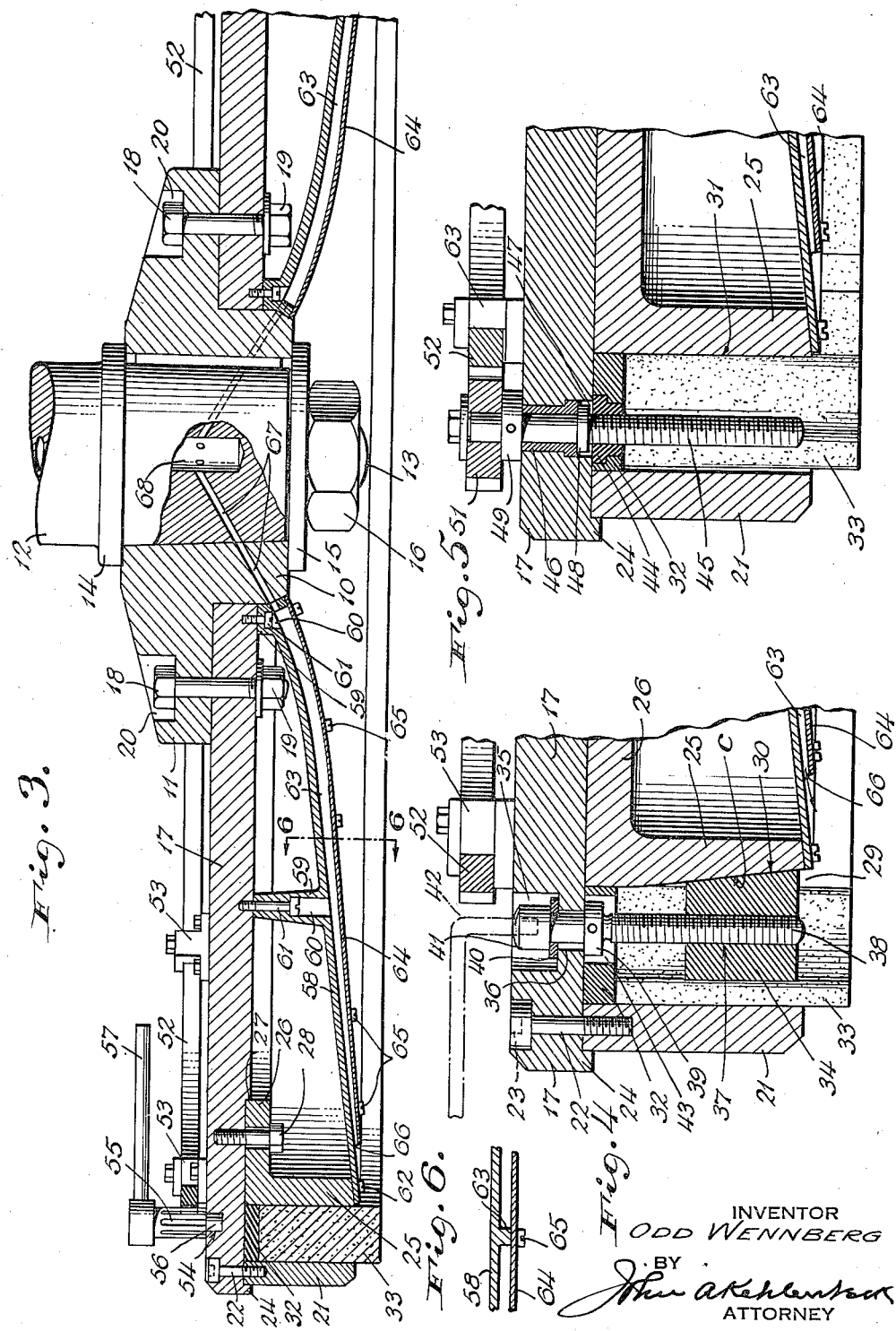

2,231,516

UNITED STATES PATENT OFFICE 2,231,516

CHUCK

Odd Wennberg, Laurelton, Long Island, N. Y.

Application March 22, 1939, Serial No. 263,331

2 Claims. (Cl. 51—209)

The invention relates to chucks and more particularly to grinding chucks embodied in grinding machines and constituting supports for the abrasive elements whereby the grinding operations are performed. The object of the invention is to provide a chuck of the indicated type constructed in a novel manner to efficiently support grinding segments in grinding positions. The invention contemplates further the provision of novel means for adjusting the grinding segments to new grinding positions to compensate for wear. In addition the invention has for its object the provision of novel means for rigidly locking said grinding segments in operative position on the chuck, and the provision of novel means for cooling said grinding segments efficiently during operative grinding periods. Other more specific objects will appear from the description hereinafter and the features of novelty will be pointed out in the claims.

In the accompanying drawings which illustrate an example of the invention without defining its limits, Fig. 1 is a fragmentary front face view of the novel chuck; Fig. 2 is a similar rear face view thereof; Fig. 3 is a fragmentary section on the line 3—3 of Fig. 2; Fig. 4 is an enlarged detail section on the line 4—4 of Fig. 1; Fig. 5 is a similar view on the line 5—5 of Fig. 2; and Fig. 6 is a detail section on the line 6—6 of Fig. 3.

In its illustrated form the novel chuck comprises a bushing 10 having an annular flange 11, and mounted upon a shaft 12 which constitutes, for instance, part of a conventional grinding machine, said shaft 12 having a threaded extension 13 at its one end; the bushing 10 with its flange 11 is keyed on said shaft 12 between an annular shoulder 14 thereof and a washer 15 and is clamped in place by means of a nut 16 screwed on said extension 13 as shown in Fig. 3.

A preferably circular base plate 17 is fitted on the bushing 10 in surface engagement with the flange 11 thereof and is fastened in position by means of bolts 18 and nuts 19, the heads of said bolts 18 preferably being countersunk in recesses 20 with which the flange 11 is provided as illustrated in Fig. 3. The base plate 17 constitutes a rotatable support and carries an outside ring 21 in perpendicular relation thereto and preferably, though not necessarily, comprising an independent member secured in place on the plate 17 by means of cap screws 22; the heads of the latter are countersunk in the base plate 17 and may be provided with sockets 23 for the accommodation of a suitable tool such as a key or wrench to facilitate the tightening of said screws 22 in the conventional manner. To maintain the outer ring 21 in proper position on the base plate 17, the latter may be provided with an annular shoulder 24 which projects over said ring 21 in surface engagement therewith as shown in Figs. 3, 4, and 5.

The base plate 17 further carries an inner ring 25 which projects in perpendicular relation to said plate 17 in spaced concentric relation to the outer ring 21 to form therewith an annular space or segment receiving groove, said inner ring 25 including a preferably integral flange 26 in surface engagement with the base plate 17 and in contact with an annular shoulder 27 thereof as illustrated in Fig. 3; the flange 26 is provided with apertures for the accommodation of cap screws 28 whereby said inner ring 25 is fastened to the base plate 17. The inner ring 25 is formed at spaced intervals on its outer surface with recesses 29, the bottom surfaces 30 of which are inclined relatively to lines perpendicular to the base plate 17 as shown in Fig. 4; the outer surface sections 31 of the inner ring 25 which are located between the recesses 29 are in parallel relation to the inner surface of the outer ring 21 as illustrated in Fig. 5.

A flat ring 32 of steel or other suitable material is fitted in the annular space between the outer ring 21 and the inner ring 25 and constitutes a backing member for the grinding segments 33. The latter are made of suitable abrasive material such as carborundum and are of arcuate form to fit the aforesaid annular space between said rings 21 and 25; the grinding segments 33 project outwardly beyond the outer ring 21 and the inner ring 25 so that the projecting portions of said segments 33 are available for grinding purposes in the operation of the grinding machine in which the novel chuck is incorporated. As shown in Figs. 1, 3 and 5, the segments 33 are located between the outer surface sections 31 of the inner ring 25 and the opposed inner surface of the outer ring 21, adjacent segments 33 being freely spaced apart in circular tandem relation to each other as illustrated in Fig. 1. The grinding segments 33 are separated and locked in place between the rings 21 and 25 by wedge-shaped blocks 34 which extend between the opposed ends of adjacent segments 33; the latter are provided with inclined end faces $a$ and $b$ which fit against the blocks 34 in surface contact therewith as shown in Fig. 1. The blocks 34 further include transverse surfaces $c$ sloping at inclinations corresponding to the inclined surface 30 of the inner ring 25 and lying in surface engagement therewith as illustrated in Fig. 4. The blocks 34 guided in the recesses 29, are movable toward and away from the base plate 17, and the surfaces c of said blocks 34 in co-operation with the surfaces 30 of the inner ring 25 cause said blocks 34 to develop a clamping action when the latter are shifted toward said base plate 17, whereby said blocks 34 are effective on the opposite ends of all of said grinding segments securely clamp the grinding segments 33 against the outer ring 21 and rigidly fix said segments 33 in the annular space between said rings 21 and 25; conversely when the blocks 34 are adjusted away from the base plate 17 the clamping action thereof on said segments 33 will be relieved so that said segments 33 may be readily adjusted in said annular space or removed from the chuck at will for any purpose. To facilitate the shifting of said blocks 34 manually operated adjusting means is included in the novel chuck. For this purpose the base plate 17 is provided with open surface recesses 35 and openings 36 at the bottoms thereof extending transversely through said base plate 17 as shown in Fig. 4; the recesses 35 and openings 36 are located at spaced intervals on the base plate 17 in registry with internally threaded openings 37 provided in the blocks 34. Adjusting screws 38 extend through the openings 36 into screwthreaded engagement with the threaded openings 37 of the blocks 34, said screws 38 being fixed against axial displacement relatively to the base plate 17 without interference with the rotary movements of said screws 38 thereon; annular collars 39 on the screws 38 and washers 40 in co-operation with the base plate 17 and the heads 41 of said screws 38 fix the latter against such axial displacement in the illustrated example of the novel chuck. The heads 41 of the screws 38 are located in the recesses 35 so as to be countersunk therein and may be provided with sockets for the accommodation of a suitable tool such as a key or wrench 42 to facilitate operation of said screws 38. As shown in Fig. 4 the backing ring 32 includes openings 43 through which the adjusting screws 38 project and in which the annular shoulders 39 are located when the ring 32 occupies its initial position in surface engagement with the base plate 17.

During operative grinding periods of the grinding machine in which the novel chuck is embodied, the active end portions of the grinding segments 33 will gradually wear away so that eventually it becomes necessary to shift said segments 33 outwardly in the annular space between the rings 21 and 25. In order to readily effect this adjustment the backing ring 32 is provided at spaced intervals with internally screwthreaded bushings 44 fixed in place against relative movement in any convenient manner. The bushings 44 are in screwthreaded connection with adjusting screws 45 rotatably mounted in bushings 46 rigidly secured in openings 47 provided in the base plate 17 and held against relative axial movement by means of annular flanges 48 and collars 49 as illustrated in Fig. 5. The bushings 44 are located on the backing ring 32 preferably so that the adjusting screws 45 project through said bushings 44 into the spaces between opposed ends of adjacent grinding segments 33. To enable all of the screws 45 to be concurrently operated to thereby bring about an even and uniform adjustment of all of the grinding segments 33 simultaneously, each screw 45 carries a pinion 51 at its upper end; it will be understood that the pinions 51 are fixed on the respective screws 45 in any convenient manner to rotate therewith. The pinions 51 are in mesh with a toothed ring 52 mounted in bearing brackets 53 on the base plate 17 so as to be capable of rotation about its axis relatively to said plate 17. It will be obvious as the ring 52 is rotated in the brackets 53 that all of the pinions 51 will be rotated about their respective axes and that as a result, all of the adjusting screws 45 will be simultaneously rotated in the respective bushings 44; because of the threaded connection between the latter and the screws 45 the aforesaid operation will, for instance, move the ring 32 outwardly in the annular space between the outer and inner rings 21 and 25 to correspondingly shift the different grinding segments 33 outwardly in such space beyond said outer and inner rings to thereby adjust said segments 33 to new grinding positions.

To facilitate the rotation of the toothed ring 52 to bring about the above operations, the base plate 17 is provided at one or more places with a recess or recesses 54 in which a suitable operating implement may be removably accommodated. The implement, as shown in Fig. 3 comprises a toothed pinion 55 from which a cylindrical projection 56 extends, and an operating handle 57 pivotally mounted on said implement; the latter further includes any conventional form of pawl and ratchet mechanism whereby pivotal reciprocation of the handle 57 will cause an intermittent rotation of the pinion 55. The projection 56 is arranged to rotatably fit into any one of the recesses 54 to thereby bring the pinion 55 into mesh with the toothed ring 52; when the implement is thus positioned, an operation of the handle 57 to intermittently rotate the pinion 55 will correspondingly rotate the toothed ring 52. The latter in turn rotates the pinions 51 to thereby simultaneously rotate all of the adjusting screws 45 and accordingly shift the backing ring 32 in the manner set forth hereinbefore.

In addition to the parts so far described, the chuck includes novel means for cooling the grinding segments 33, which means as shown comprises a circular, dished plate 58 including integral lugs 59 of varying lengths whereby said plate 58 is mounted on the base plate 17 in inclined relation thereto. The lugs 59 are provided with openings 60 for the accommodation of screws 61 whereby said dished plate 58 is fastened in place, said plate 58 projecting over the inner ring 25 and being secured thereto by screws 62 as shown in Fig. 3. On its outer face the dished plate 58 is formed with fins 63 which are preferably curved as illustrated in Fig. 1 to form spiral spaces between adjacent fins 63; the latter are of progressively reduced height toward the outer periphery of the dished plate 58 and terminate at a distance from said periphery as shown in Fig. 3. A circular dished cover 64 is mounted on the fins 63 and fastened in place thereon by means of screws 65, said cover 64 having its outer periphery substantially in registry with terminating outer ends of the fins 63; with this arrangement a circular exit slot 66 is formed between the dished plate 58 and the cover 64 at the outer periphery of the latter in proximity to the exposed active portions of the grinding segments 33 as illustrated in Fig. 3. The previously mentioned spiral spaces between the fins 63 are covered by the dished cover 64 and converted thereby into spiral channels leading to said exit slot 66. The spiral channels are in communication with conduits 67 provided in the bushing 10 and shaft 12, which conduits 67 in turn lead to a passage 68 extending lengthwise of the shaft 12 and connected in any convenient manner with a source of water or other suitable cooling fluid.

In practice the backing ring 32 initially is located at the bottom of the annular space between the outer ring 21 and inner ring 25 in surface contact with the base plate 17 and is maintained in this position by the adjusting screws 45. The grinding segments 33 are mounted in said annular space in contact with the backing ring 32 and in surface engagement with outer surface sections 31 of the inner ring 25 and the opposed inner surface portions of the outer ring 21; as illustrated in Fig. 1 the grinding segments 33 are spaced apart in circular tandem relation by the blocks 34, each of which engages the inclined end faces a and b of contiguous segments 33. When the latter have been set in place between the rings 21 and 25, the adjusting screws 38 are actuated by means of the wrench 42 in a direction to draw the blocks 34 toward the base plate 17; as this takes place, the surfaces c and 30 co-operate to shift said blocks 34 toward the segments 33 whereby the latter are forced against the outer ring 21 and firmly clamped in place on the chuck.

In operation the shaft 12 is rotated by conventional mechanism forming part of the grinding machine in which the novel chuck is embodied and consequently rotates the latter in the performance of its grinding functions in the well-known way. At least during the periods during which the grinding segments 33 are actually engaged in grinding operations, a cooling fluid such as water passes from the passages 68 through the conduits 67 into the chambers between the spiral fins 63. This cooling fluid issues from the exit slot 66 in the form of a cone-shaped sheet or spray and at the same time under the directional influence of the fins 63 develops a spiral motion; this sheet or spray of cooling fluid is directed against the active grinding portions of the segments 33 and by its direct action thereon maintains said segments 33 in a cool condition of maximum efficiency.

As the segments 33 after a period of use are worn away it becomes necessary to reset the same on the chuck, or in other words to shift said segments 33 outwardly relatively to the outer ring 21 and inner ring 25 to new grinding positions. This may be accomplished by first operating the screws 38 in a manner to shift the blocks 34 in directions away from the base plate 17 to thereby release the grinding segments 33 from the clamping action of said blocks 34. The projection 56 of the operating tool may then be set into any one of the recesses 54 with the pinion 55 in mesh with the toothed ring 52. A pivoted operation of the handle 57 may then be effected to intermittently rotate the pinion 55 and to thereby correspondingly rotate the ring 52 in the brackets 53. This actuation of said ring 52 is communicated to the pinions 51 which in turn rotate the adjusting screws 45; the latter by acting on the bushings 44 shift the backing ring 32 away from the base plate 17, it being understood that the aforesaid operations are carried out in a manner to bring about this result. As the backing ring 32 is thus shifted, the grinding segments 33 will all be simultaneously adjusted outwardly relatively to the rings 21 and 25; this adjustment is continued until the grinding segments 33 occupy the desired position after which the adjusting screws 38 are operated to cause the blocks 34 to clamp said segments 33 in the new set positions. The grinding operation may then be resumed by a renewed rotation of the shaft 12 and the chuck carried thereby and continued until it is necessary, because of wear, to again set the segments 33 to a new grinding position whereupon the aforesaid operations are repeated.

It will be noted that the aforesaid adjustment of the backing ring 32 is such that all of the grinding segments 33 are concurrently and uniformly shifted to a new operative position, and also that said ring 32 constitutes a rigid backing for said segments 33 in all positions of the latter. When the segments 33, because of continued use and repeated settings to new positions are no longer serviceable, said segments 33 may be removed from the chuck and replaced with a new group of grinding segments 33; before this replacement takes place, the backing ring 32 is first shifted back into contact with the base plate 17 at the bottom of the space between the rings 21 and 25 or to some intermediate position therein dependent upon the dimensions of the new segments 33. The latter may then be clamped in position in the manner previously described herein.

The novel chuck is simple in construction and may be operated to effect the desired adjustments and clamping of the grinding segments 33 with a minimum of effort and without the necessity for any particular skill on the part of the operator. The time factor inherent in said adjustments is also reduced to a minimum, and absolute accuracy in the positioning of all of the segments 33 on the chuck is assured. The novel chuck may readily be embodied in existing grinding machines and increases the operative efficiency thereof to a maximum degree.

Various changes in the specific forms shown and described may be made within the scope of the claims without departing from the spirit of the invention.

I claim:

1. A grinding chuck comprising a rotatable base plate, an outer ring on said base plate in perpendicular relation to a surface thereof, an inner ring on said base plate in perpendicular relation to said surface thereof and in spaced concentric relation to said outer ring, said inner ring having spaced recesses with bottom surfaces inclined relatively to lines perpendicular to said surface of said base plate, a continuous independent backing ring fitted in the annular space between said inner and outer rings and movable therein toward and away from the free edges of said inner and outer rings, arcuate grinding segments located in said annular space in free engagement with said backing ring in circular spaced tandem relation with each other and having inclined end faces at their opposite ends, wedge-shaped blocks guided in said spaced recesses and fitted between the opposed ends of adjacent grinding segments in contact with the inclined end faces thereof and having sloping surfaces in engagement with the inclined bottom surfaces of the recesses of said inner ring, means for adjusting said wedge-shaped blocks in said recesses toward said base plate whereby said sloping surfaces and inclined bottom surfaces co-operate to cause said wedge-shaped blocks to clamp said grinding segments in place in said annular space, adjusting screws in threaded engagement with said backing ring, and means for rotating all of said adjusting screws simultaneously to thereby shift said backing ring in said annular space for concurrently shifting all of said grinding segments in directions out of said space to new grinding positions relatively to said inner and outer rings.

2. A grinding chuck comprising a rotatable base plate, an outer ring on said base plate in perpendicular relation to a surface thereof, an inner ring on said base plate in perpendicular relation to said surface thereof and in spaced concentric relation to said outer ring, said inner ring having spaced recesses with bottom surfaces inclined relatively to lines perpendicular to said surface of said base plate, a continuous independent backing ring fitted in the annular space between said inner and outer rings and movable therein toward and away from the free edges of said inner and outer rings, arcuate grinding segments located in said annular space in free engagement with said backing ring in circular spaced tandem relation with each other and having inclined end faces at their opposite ends, releasable means guided in said spaced recesses and co-operating with the inclined bottom surfaces thereof to clamp said grinding segments in place in said annular space, adjusting screws in threaded engagement with said backing ring extending into the spaces between said grinding segments, pinions mounted on said adjusting screws to rotate therewith, a toothed ring rotatably mounted on said plate in mesh with said pinions, and removable means for rotatably actuating said toothed ring to thereby operate said pinions and simultaneously rotate all of said adjusting screws to shift said backing ring in said annular space for concurrently adjusting all of said grinding segments in directions out of said space to new grinding positions relatively to said inner and outer rings.

ODD WENNBERG.